United States Patent [19]

Fukae

[11] Patent Number: 4,653,061
[45] Date of Patent: Mar. 24, 1987

[54] SLAB GEOMETRY LASER DEVICE
[75] Inventor: Kenneth Fukae, Irvine, Calif.
[73] Assignee: Amada Engineering & Service Co., Inc., La Mirada, Calif.
[21] Appl. No.: 777,850
[22] Filed: Sep. 19, 1985
[51] Int. Cl.$^4$ ............................................. H01S 3/06
[52] U.S. Cl. ...................................... 372/66; 372/71; 372/107
[58] Field of Search ...................... 372/66, 71, 107, 33

[56] References Cited

U.S. PATENT DOCUMENTS 4,378,601  3/1983  Eggleston, III et al. ............. 372/66

Primary Examiner—Leon Scott, Jr.
Attorney, Agent, or Firm—Wigman & Cohen

[57] ABSTRACT

The present invention relates to a specific holding structure of a slab geometry crystal for a total internal reflection, slab geometry laser (otherwise known as face pumped laser) device. Both sides of the crystal are held by side rails, and on both longitudinal end portions of the crystal o-ring backing flanges and box-shaped end pieces, respectively, are put on. Furthermore, an o-ring is put in between the end piece and the o-ring backing flange on each end portion of the crystal, and it is compressed to seal the crystal. This o-ring can be made of translucent elastomer. Accordingly, the slab geometry laser device that is compact and easy to remove from, or place into the pump station is provided.

5 Claims, 24 Drawing Figures

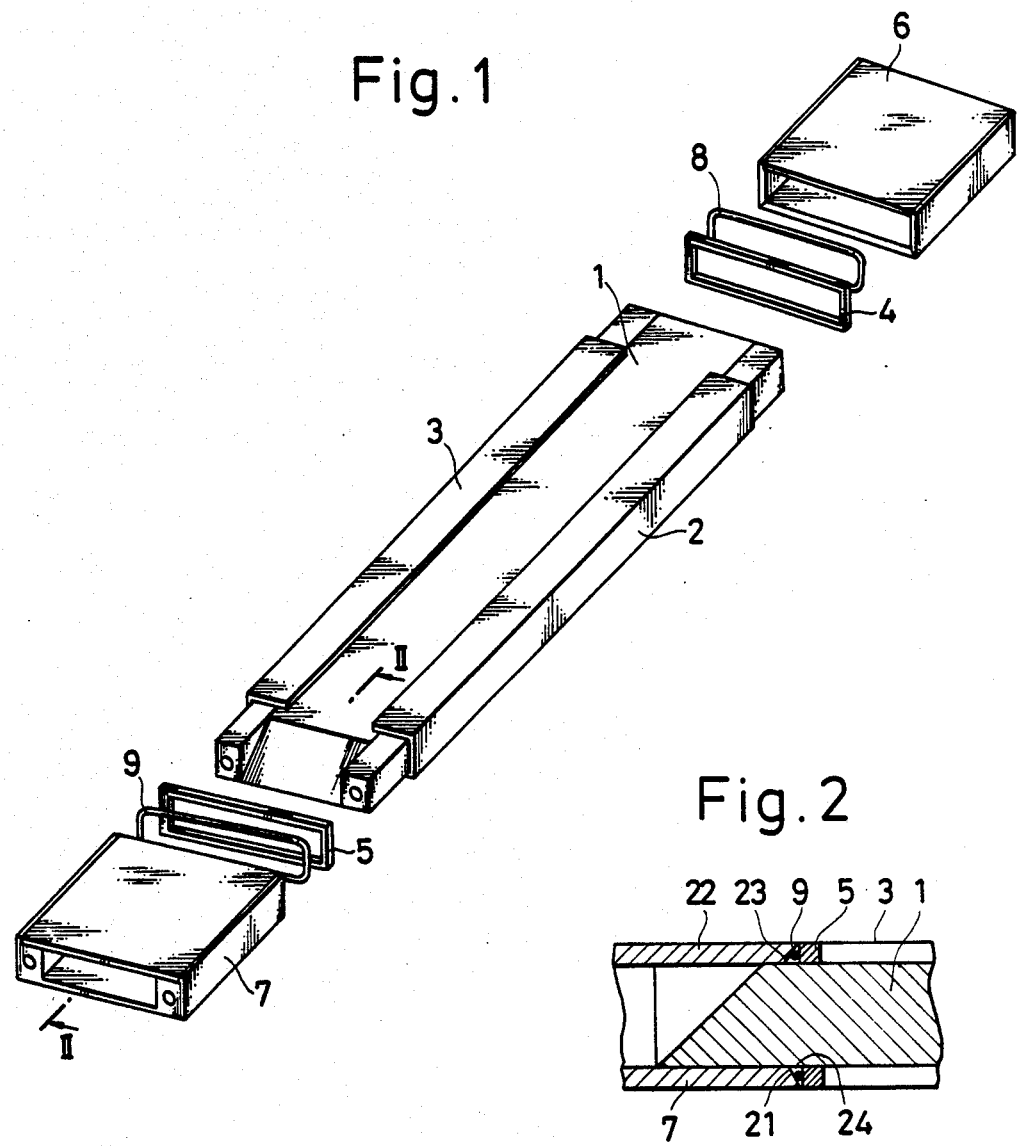
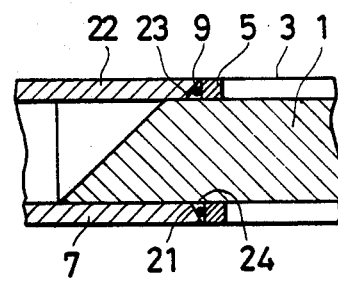

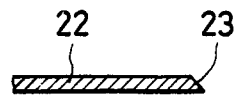
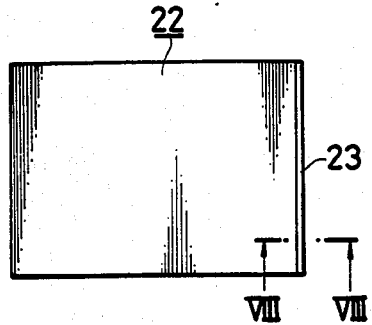
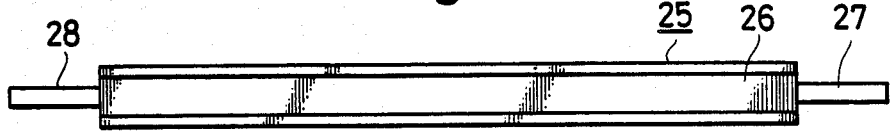
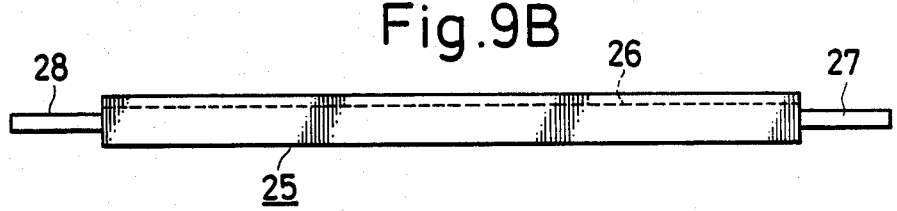
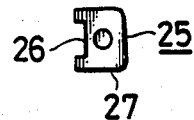
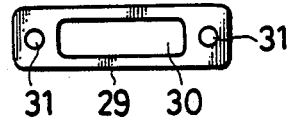

SLAB GEOMETRY LASER DEVICE

BACKGROUND OF THE INVENTION

The present invention relates to a slab geometry laser device (otherwise known as a total internal reflection, face pumped laser device), and more particularly to a specific structure for holding the slab geometry crystal material.

The total internal reflection, slab geometry laser is based on concepts that result in beam quality improvements over conventional rod geometry solid state lasers. All solid state lasers suffer from thermally induced beam defocusing, birefringence and depolarization due to flash lamp pumping. The key difference between the two crystal geometries is that in the rod geometry crystal, the thermal gradient is radial, whereas in the slab geometry crystal, the thermal gradient is one dimensional.

In slab geometry lasers, the crystal cross section is rectangular with an aspect ratio of greater than 2:1 (long side to shorter side). The faces with the largest area are exposed to the flashlamp, thus setting up a gradient in the direction along the shorter side line; the direction of the gradient being away from the centerline of the crystal cross section. If the generated laser wavefronts were to pass straight through the slab crystal as it does through the rod, there would obviously be no benefit with the rectangular cross section. The benefit comes when the light is introduced at an angle into the crystal so that the wavefront is reflected internally between the crystal faces. It is crucial that the wavefront passes through the centerline of the crystal an even number of times so that the wavefront experiences a refractive gradient which is opposite in direction to the gradient it encountered before the internal reflection, therefore, any effects due to birefringence are effectively canceled. Of course, this is assuming that there is a perfectly uniform thermal gradient in said direction. In reality, the sides of the crystal that are not being pumped are not completely isolated thermally, and so there may be a small gradient in the direction (along the longer side line). The effects will be most noticeable at the corners of the crystal, as seen from the output.

As was suggested in the previous discussion, a one dimensional thermal gradient can only be achieved if the sides of the slab are insulated against heat transfer from the side of the crystal. In addition to this, the sides of the crystal must be sealed from the cooling water that makes contact with the crystal faces. The obvious choice of material which satisfies both requirements is an elastomer capable of withstanding relatively high temperatures (up to 100° C.), and exposure to ultraviolet radation.

The motivation for the particular design of the slab holder in this invention is that it is modular in that it can be removed from the pump station without disturbing any other pump station parts. The motivation for this invention is that the crystal need not be permanently fixed to the holding device. Before attempting to achieve the modularity, specific system requirements must serve as guidelines.

The first guideline is that no water can make contact with any of faces to be used in the path of the beam. This is an obvious necessity, but one that is difficult to achieve. Previously, the method used to mount the crystal into the crystal holder consisted of using a sealant such as a silicone elastomer to provide a stress free seal between the crystal and the crystal holder. Two problems arise when this method is used. The first problem is that the mount is semipermanent, and should the crystal need to be removed from the mount; care must be taken to remove the sealant. The second problem arises from the fact that silicone sealants contain acids which could damage certain crystals during the curing phase of the sealant. This invention avoids these problems through the use of a translucent elastomeric o-ring coupled with some unique elements to from a non-permanent seal.

The second guideline specifies that the sides of the crystal must be sealed and insulated. This means that the entire length of the crystal will have insulation on the sides, and implies that the o-rings at the end of the crystal will pass over the insulating material at some point. This is not an ideal situation; at the same time, it is not prohibitive as long as the insulating material, the crystal, and the crystal retaining rails form a flush surface which the o-ring will pass over.

Ideally, the o-ring should only make contact with one continuous surface. In this invention, the o-ring makes contact with three different surfaces, and it is not obvious that this will form a successful seal. The prototype demonstrates, however, that as long as the insulation layer is thin, somewhat harder that the o-ring, and forms an even surface between the crystal and the side rail, the seal will be successful.

The third guideline requires that a maximum amount of area is to be exposed to the flashlamps. This leaves the holder with few contact areas with which to contain and seal the crystal. In this particular design, the crystal side retaining rails will be fabricated so that there is a slight overhang so that it may position the crystal, and protect the insulation material from being directly exposed to flashlamp radiation.

Accordingly, an object of the present invention is to make a holding device that is compact and easy to remove from, or place into, the pump station.

DESCRIPTION OF PRIOR ART

In U.S. Pat. No. 4,378,601, a crystal holder is described which uses a method of permanently mounting a seal to the end faces. Described in the claims are six basic elements that comprise the slab crystal holder. This invention does not lay claim to those elements which are conceptually similar. The design of this invention incorporates the use of two unique elements described here as the o-ring backing flange. These elements are crucial to the operation of this invention, and do not infringe upon the claims made in the above mentioned U.S. patent. The elements described in this invention as the end pieces are also crucial to this design, and are functionally different than those elements described in the specific U.S. patent which occupy similar physical locations.

Additionally, all of the elements in this invention are simpler to machine, and therefore are cheaper to manufacture. The net effect of all of these parts constitute an improved or unique method of crystal mounting over the method described in the prior art.

SUMMARY OF THE INVENTION

The present invention discloses a slab geometry laser device comprised of end pieces put on both ends of the slab crystal, side rails put on both sides of the crystal, o-rings for sealing the end faces of the crystal, and o- ring backing flanges for compressing the o-rings between the end pieces. The device is possible to be modular in that it can be removed from the pump station. Another feature of the invention is a groove formed between each end piece and o-ring backing flange for maintaining and compressing the o-ring in the proper direction, which has a specific volume ratio against the o-ring volume in order to provide minimum stress and maximum seal.

BRIEF DESCRIPTION OF THE INVENTION

FIG. 1 is an exploded perspective view of the crystal holding device of one embodiment of the present invention.

FIG. 2 is a cross sectional view of line II—II on FIG. 1.

FIG. 7A is a plan view of the cap for the end piece of FIG. 5A and B.

FIG. 7B is a side view of the cap of FIG. 7A.

FIG. 8 is a cross sectional view of line VIII—VIII on FIG. 7A.

FIG. 9A is a front view of the side rail of another embodiment of the invention.

FIG. 9B is a plan view of the side rail of FIG. 9A.

FIG. 9C is a side view of the side rail of FIG. 9A.

FIG. 10A is a front view of the o-ring backing flange of the other embodiment.

FIG. 10B is a side view of the o-ring backing flange of FIG. 10A.

DETAILED DESCRIPTION OF THE INVENTION

Referring to FIG. 1, one of the prefered embodiments of the crystal holding device for the slab geometry laser device of the present invention consists of six elements: two side rails 2 and 3, two o-ring backing flanges 4 and 5, and two end pieces 6 and 7. Between the o-ring backing flanges 4, 5 and the end pieces 6, 7, translucent o-rings 8 and 9 are inserted.

Figure 3A:
FIG. 3A is a front view of the side rail of one embodiment.
Figure 3B:
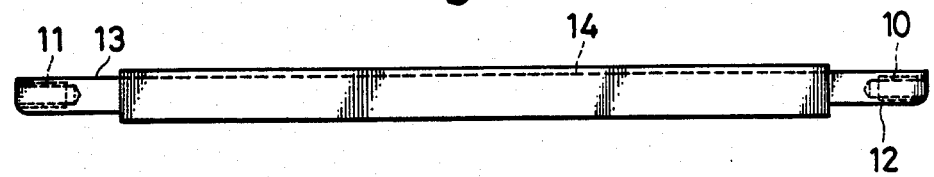
FIG. 3B is a plan view of the side rail of FIG. 3A.
Figure 3C:
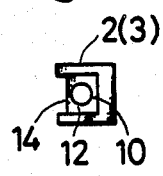
FIG. 3C is a side view of the side rail of FIG. 3A.

As shown in FIGS. 3A, B and C, the side rails 2 and 3 along the side face of the crystal 1 respectively have projecting end portions 12 and 13. In both projecting end portions 12 and 13 are provided threaded holes 10 and 11. The shallow channel 14 of the side rails 2 and 3 is to be engaged with the side end of the crystal 1.

Figure 4A:
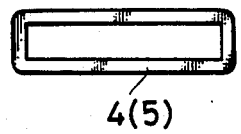
FIG. 4A is a front view of the o-ring backing flange of one embodiment.
Figure 4B:
FIG. 4B is a side view of the o-ring backing flange of FIG. 4A.

As shown in FIGS. 4A and B, the o-ring backing flanges 4 and 5 are formed in a square ring-shape so that it can encircle the circumference of the projecting end portions 12 and 13 of the side rails 2 and 3 when the projecting portions are engaging with the crystal 1.

Figure 5A:
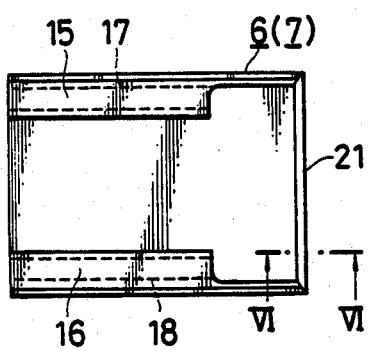
FIG. 5A is a plan view of the end piece of one embodiment.
Figure 5B:
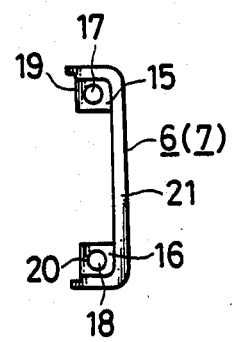
FIG. 5B is a side view of the end piece of FIG. 5A.
Figure 6:
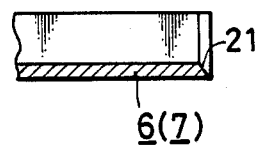
FIG. 6 is a cross sectional view of line VI—VI of FIG. 5A.

The end pieces 6 and 7 of the crystal, as shown in FIGS. 5A and B, are box-shaped with the top, front and back sides opened, and provided with thick portions 15 and 16 at both sides with screw insertion apertures 17 and 18. The upper faces 19 and 20 of the thick portions are slightly lowered for engagement with cap 22. The inner ends of the pieces 6 and 7 are cut at angle 45° and formed a inclined plane 21.

The cap 22 shown in FIGS. 7A and B is fixed by welding or soldering to the upper faces 19 and 20 of the end pieces 6 and 7 so as to complete a box-shaped holder for holding the end portions of the crystal 1. The inner end of the cap 22 is also cut at an angle 45° for forming inclined plane 23.

As can be seen in FIG. 1, the six elements abovementioned for holding the crystal 1 are assembled as follows: putting the side rails 2 and 3 on each side of the crystal 1 with laying therebetween a translucent silicon insulation (not shown in the drawings), respectively, placing the o-ring backing flanges 4 and 5 on the projecting portions 12 and 13 of both side rails 2 and 3, attaching the o-rings 8 and 9 to both o-ring backing flanges 4 and 5, and then mounting the end pieces 6 and 7 on both projecting portions 12 and 13 of the side rails 2 and 3, and finally anchoring by screws the end pieces 6 and 7 with the side rails 2 and 3 through screw-insertion apertures 15, 16 and the screwed holes 10, 11.

In this assembled structure, as shown in FIG. 2, the longitudinal sides of the crystal 1 are held by the side rails 2 and 3, and both end faces of the crystal are covered by the end pieces 6 and 7. Furthermore, the o-rings 8 and 9 are maintained in the V-shaped groove 24 around the crystal 1 which is formed between each surface of the o-ring backing flanges 4, 5 and inclined plane 21 of the end pieces 6, 7 and between each surface of the o-ring backing flanges 4, 5 and the inclined plane 23 of the cap 22. The pressure to the o-rings 8 and 9 is adjustable by the screws screwed into the side rails through the end pieces, respectively.

The end pieces 6 and 7 serve two functions: (1) to provide a place to mount the side rails 2 and 3, and (2) to shroud and seal the ends of the crystal 1. By mounting the side rails 2 and 3 with the end pieces 6 and 7, the goal of modularity has been achieved. The end pieces 6 and 7 also serve as a means to hold the insulation against the crystal sides. The end pieces 6 and 7 must be solid, or at least have no porous seams for water to leak through. In order to ease machining requirements, the end pieces 6 and 7 are divided in two pieces of body and cap which are to be soldered or welded together.

The o-ring backing flanges 4 and 5 will be used to provide backing for the o-rings 8 and 9 so that it may be compressed when pressure is applied by the end pieces 6 and 7. Its construction is simple in that it is a single machined piece made to slide into place on the ends of the side rails. The side rails 2 and 3 are solid pieces, and the critical dimensions exist in the area where the insulators and crystal must rest. be corrosion resistant or coated with a corrosion resistant material. They must also be mechanically rigid.

The ratio of o-ring volume to o-ring groove volume should be between 80% and 90% in order to provide minimum stress and maximum seal. The o-rings 8 and 9 themselves should be made of viton or silicone, and should be translucent.

FIGS. 9 through 14 show another embodiment of the present invention. As shown in FIGS. 9A, B and C, the side rail 25 has a shallow groove 26 for holding the crystal 1 and has cylindrical projections 27 and 28 at both ends. O-ring backing flange 29 is, as shown in FIGS. 10A and B, provided with a rectangular opening 30 at its central portion for the crystal 1 engage through, and at its side portions, circular openings 31 and 32 for the cylindrical projections 27 and 28 to insert through.

Figure 11A:
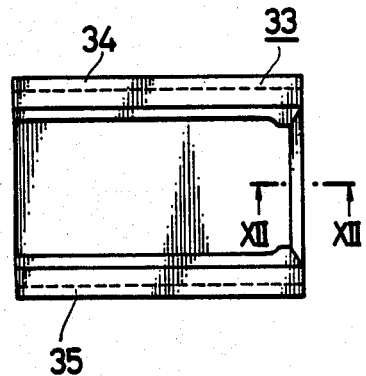
FIG. 11A is a plan view of the end piece of the other embodiment.
Figure 11B:
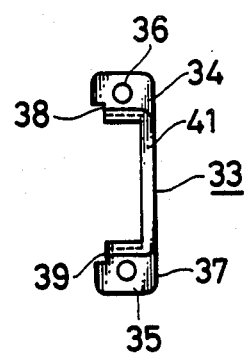
FIG. 11B is a side view of the end piece of FIG. 11A.
Figure 12:
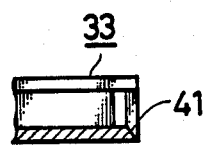
FIG. 12 is a cross sectional view of line XII—XII on FIG. 11A.
Figure 13A:
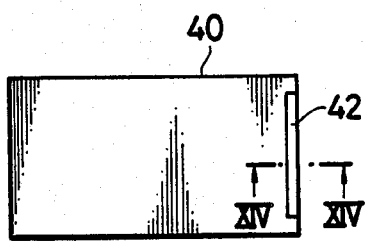
FIG. 13A is a plan view of the cap for the end piece of FIG. 11.
Figure 13B:
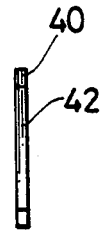
FIG. 13B is a side view of the cap of FIG. 13A.
Figure 14:
FIG. 14 is a cross sectional view of line XIV—XIV on FIG. 13A.

As shown in FIGS. 11A and B and 12, end piece 33 is box-shaped with one opening to the air at its top side and both outer and inner sides, and having thick portions 34 and 35 on its both sides. In these thick portions 34 and 35, circular holes 36 and 37 are provided for the cylindrical projections 27 and 28. The upper faces 38 and 39 of the thick portions 34 and 35 are lowered for engaging and welding or soldering cap 40 shown in FIGS. 13A and B therewith.

The inner end face of the end piece 33 and that of the cap 40 are cut at an angle of 45° for forming the o-ring groove between the ends thereof and the o-ring backing flange 29.

As for the second embodiment abovementioned, the holding structure of the crystal 1 is assembled by the similar order as mentioned for the first embodiment. The difference of the second embodiment from the first embodiment is that the o-ring is placed entirely around the slab crystal surfaces, and does not pass over three different surfaces as it does in the first embodiment. This second structure is preferable due to the reason as follows:

One of the most important aspects of the slab glass or crystal holder is that it provides a mount that does not stress the slab mechanically. It has been found experimentally that stressing the slab in this manner lowers the damage threshold due to optical pumping significantly. The solution to this problem comes from an adjustment of certain dimensions on the side rails so that there is sufficient tolerance for free movement of the side rails in the end pieces. The amount of pressure placed on the o-ring will then be dictated soley by the assembler of the slab and the holder. The second embodiment has satisfied this requirement.

What I claim is:

1. A crystal holding device of a slab geometry laser device comprising:
   a crystal material with slab geometry,
   side rails for holding the both sides of said crystal,
   an o-ring backing flange mounted on the longitudinal end portions of said side rails holding said crystal at its both sides,
   a box-shaped end piece put on said end portions of said side rails for holding said side rails with said crystal, and
   an o-ring lying in the groove formed around said crystal, between the outer face of said o-ring backing flange and the inner face of said end piece.

2. The device of claim 1 wherein said o-ring groove around said crystal comprises a V-shaped gap formed between said o-ring flange and the inclined plane made by slant cutting the inner edge of said end piece.

3. The device of claim 1 wherein said side rails have a cylindrical projection for inserting into a circular opening provided in said end piece to let said o-ring encircle solely around said crystal surface.

4. The device of claim 1 wherein said o-ring is made of translucent elastomer.

5. The device of claim 1 wherein said o-ring having the volume ratio of 80–90% to that of said o-ring has groove.

* * * * *